(12) United States Patent
Widawski et al.

(10) Patent No.: US 6,225,021 B1
(45) Date of Patent: May 1, 2001

(54) PHOTOPOLYMERIZABLE COMPOSITION BASED ON POLYISO(THIO)CYANATE MONOMERS AND ON MONOMERS WITH A LABILE PROTON, COMPRISING A PHOTOINITIATING AGENT AND AN AGENT FOR ACTIVATING THE PHOTOPOLYMERIZATION AND OPTICAL ARTICLES OBTAINED

(75) Inventors: Gilles Widawski, Paris; Leanirith Yean, Longjumeau; Jean-Paul Marchand, Creteil, all of (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/384,779

(22) Filed: Aug. 27, 1999

Related U.S. Application Data

(63) Continuation of application No. PCT/FR98/02872, filed on Dec. 24, 1998.

(30) Foreign Application Priority Data

Dec. 29, 1997 (FR) .................................................. 97 16632

(51) Int. Cl.⁷ ...................................................... G03F 7/004
(52) U.S. Cl. .................................... 430/270.1; 430/281.1; 522/18

(58) Field of Search ............................... 430/281.1, 270.1; 522/18

(56) References Cited

U.S. PATENT DOCUMENTS

| | | | |
|---|---|---|---|
| 4,221,646 | 9/1980 | Finelli et al. | 204/159 |
| 5,418,112 | 5/1995 | Mirle et al. | 430/269 |
| 5,585,201 | * 12/1996 | Ha | 428/64.4 |
| 5,736,609 | * 4/1998 | Irizato et al. | 525/131 |

FOREIGN PATENT DOCUMENTS

| | | |
|---|---|---|
| 0751161 | 1/1997 | (EP) . |
| 5-025240 | 2/1993 | (JP) . |

OTHER PUBLICATIONS

DWPI Abstract JP 5025240, Feb. 1993.*

* cited by examiner

*Primary Examiner*—Hoa Van Le
*Assistant Examiner*—Rosemary Ashton
(74) *Attorney, Agent, or Firm*—Fulbright & Jaworski LLP

(57) ABSTRACT

The composition according to the invention comprises at least one polymerizable monomer with a labile proton, at least one polymerizable monomer with an iso(thio)cyanate group, a photoinitiating agent and an agent for activating the photoinitiator chosen from phosphines and phosphorus halides.

35 Claims, No Drawings

PHOTOPOLYMERIZABLE COMPOSITION BASED ON POLYISO(THIO)CYANATE MONOMERS AND ON MONOMERS WITH A LABILE PROTON, COMPRISING A PHOTOINITIATING AGENT AND AN AGENT FOR ACTIVATING THE PHOTOPOLYMERIZATION AND OPTICAL ARTICLES OBTAINED

This application is a continuation of international application number PCT/FR98/02872 filed Dec. 24, 1998, which is a continuation of French application No. 97/16632 filed Dec. 29, 1997.

The present invention relates generally to a photopolymerizable composition, comprising at least one polymerizable monomer with a labile proton and at least one polymerizable monomer comprising one or more iso(thio)cyanate functional groups, in particular for the manufacture of optical articles, such as organic ophthalmic glasses or coating varnishes for optical articles made of organic glass.

Organic ophthalmic glasses are lighter, less brittle and more easily colorable than inorganic glasses. Furthermore, the process of working them is often easier. For these reasons, organic ophthalmic glasses have shown great development in recent years.

Thus, a polymer obtained by polymerization of ethylene glycol bis(allyl carbonate) is commonly used for the manufacture of ophthalmic lenses made of organic glass. The polymerized resins obtained from this polymer have excellent properties of impact strength, of colorability and of lightness.

Nevertheless, the refractive index of the organic glasses obtained ($n_D$=1.50) is significantly lower than that of conventional inorganic glasses, which implies an increase in thickness at the center of the lens.

In order to overcome this disadvantage, ophthalmic lenses made of organic glass have been prepared which are made from polythiourethane, which lenses make it possible to satisfy this requirement.

Thus, U.S. Pat. No. 4,775,733 discloses the manufacture of organic lenses with a high refractive index obtained by thermal polymerization of a polyisocyanate and of a polythiol.

U.S. Pat. No. 4,689,387 discloses the manufacture of a resin for lenses based on S-alkyl thiocarbamate, which consists in thermally polymerizing one or more compounds comprising one or more isocyanate functional groups with one or more aliphatic compounds comprising one or more SH groups.

Patent EP-A-0,751,161 discloses, for its part, the production of organic glasses by UV polymerization of a polythiol compound and of a polyiso(thio)cyanate compound, and a compound having two or more reactive unsaturated groups and a photopolymerization catalyst. Although this document indicates that the composition can be polymerized in a short period of time, even by photopolymerization, all the examples in this document relate to a mixed polymerization comprising a prepolymerization by UV irradiation for at least 15 minutes, followed by thermal polymerization for at least 2 hours.

It would therefore be desirable to have available compositions for the manufacture of organic glasses, in particular organic glasses with a high refractive index (>1.54), which can be rapidly photopolymerized, in particular by UV polymerization.

An object of the present invention is therefore to provide a monomer composition, in particular for the manufacture of optical articles, which is rapidly photopolymerizable.

An object of the present invention is more particularly to provide photopolymerizable compositions, in particular for the manufacture of organic glasses, comprising monomers with a labile proton and with an iso(thio)cyanate functional group, which are easily and rapidly photopolymerizable.

A further subject-matter of the present invention is compositions as defined above for the manufacture of organic glasses with a high refractive index (greater than 1.54).

Another subject-matter of the invention is optical articles and in particular ophthalmic lenses obtained by photopolymerization of the above compositions.

It has been found, surprisingly, that, by adding a specific activating agent to a photopolymerizable composition comprising at least one monomer with a labile proton and at least one monomer comprising one or more iso(thio)cyanate functional groups and a photoinitiating agent, it is possible to obtain compositions which can photopolymerize in a very short time.

More particularly, it has been found that, by adding an activating agent chosen from phosphines and phosphorus halides to the compositions based on monomers with a labile proton and with an iso(thio)cyanate functional group comprising a conventional polymerization photoinitiator, an exceptional acceleration of the photopolymerization of the composition, in particular under the action of ultraviolet radiation, is very surprisingly obtained.

According to the invention, the photopolymerizable compositions comprise at least one polymerizable monomer with labile protons and at least one polymerizable monomer comprising one or more iso(thio)cyanate functional groups and a photoinitiating agent and are characterized in that they comprise at least one agent for activating the photoinitiating agent chosen from phosphines, phosphorus halides and their mixtures.

Phosphines are trivalent phosphorus compounds and the phosphorus halides coming within the scope of the present invention are preferably phosphorus compounds in which the phosphorus atom is trivalent.

Phosphines suitable in the present invention can be represented by the formula $(R)_{3-x}PH_x$ (I), in which the R radicals, which are identical or different, represent a linear or branched alkyl radical, an unsubstituted or substituted cycloalkyl radical, a linear or branched alkenyl radical, an unsubstituted or substituted cycloalkenyl radical, an unsubstituted or substituted aryl radical, an unsubstituted or substituted (alkyl)aryl radical or an (unsubstituted or substituted aryl)alkyl radical and x is an integer equal to 0, 1 or 2.

In the present application, the term "activating agent" is understood to mean any compound or mixture of compounds which, combined with the photoinitiating agent of the polymerizable mixture, increases the rate of photopolymerization of the mixture with respect to the rate of polymerization of this same mixture not comprising the activating agent and subjected to the same photopolymerization conditions.

A first polymerizable monomer constituent of the compositions according to the invention comprises one or more polymerizable monomers with a labile proton.

The term "polymerizable monomer with a labile proton" is understood to mean, in the present invention, any monomer comprising one or more functional groups having at least one labile hydrogen atom.

The monomers with a labile proton according to the invention are preferably devoid of an unsaturated group polymerizable by the radical route.

The compounds with a labile proton of the present invention which are recommended are the compounds comprising thiol (SH), alcohol (OH) and primary or secondary amine ($NH_2$; NH) functional groups or combinations of these functional groups.

Mention may be made, among the compounds with a labile proton which are recommended in the present invention, of aliphatic polythiols, aromatic polythiols, halogenated aromatic polythiols or heterocyclic polythiols. Numerous examples of these polythiols which can be used in the present invention are given in Patent EP-A-0,751,161.

Mention may be made, among the polythiols which are recommended according to the present invention, of aliphatic polythiols, such as pentaerythritol tetrakis(3-mercaptopropionate).

A recommended class of aliphatic polythiols corresponds to the formula (II):

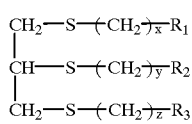

(II)

in which $R_1$, $R_2$ and $R_3$ represent H or SH, x, y and z are integers between 0 and 8, preferably between 1 and 4, and at least two from $R_1$, $R_2$ and $R_3$ represent an SH group.

Mention may be made, among the compounds of formula (II) above, or 1-(1'-mercaptoethylthio)-2,3-dimercaptopropane [sic], 1-(2'-mercaptopropylthio)-2,3-dimercaptopropane [sic], 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2,3-mercaptopropane, 1,2-bis(1'-mercaptomethylthio)-3-mercaptopropane, 1,2-bis(2'-mercaptoethylthio)-3-mercaptopropane, 1,2-bis(3'-mercaptopropylthio)-3-mercaptopropane, 1,2-bis(4'-mercaptobutylthio)-3-mercaptopropane, 1,2-bis(5'-mercaptopentylthio)-3-mercaptopropane, 1,2-bis(6'-mercaptohexylthio)-3-mercaptopropane, 1,2,3-tris(1'-mercaptomethylthio)propane, 1,2,3-tris(2'-mercaptoethylthio)propane, 1,2,3-tris(3'-mercaptopropylthio)propane, 1,2,3-tris(4'-mercaptobutylthio)propane, 1,2,3-tris(5'-mercaptopentylthio)propane and 1,2,3-tris(6'-mercaptohexylthio)propane.

A polythiol or formula (II) which is particularly recommended in the present invention is 1,2-bis(2'-mercaptoethylthio)-3-mercaptopropane [or 4-mercaptomethyl-3,6dithia-1,8octanedithiol (MDO)].

These compounds of formula (II) are described more fully in Patent EP-A-0,751,161.

Another recommended class of polythiol monomers are the polythiols corresponding to the formula:

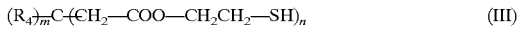

(III)

in which $R_4$ is a $C_1$–$C_5$ alkyl group, preferably a $CH_3$ or $C_2H_5$ group, a $C_1$–$C_5$ haloalkyl group, preferably a halomethyl or haloethyl group, the halogen preferably being bromine, and halogens, preferably bromine, m is an integer from 0 to 2 and n=4-m.

Mention may be made, among the monomers with a labile proton comprising alcohol functional groups, of polyols, for example diols, such as butanediol and hexanediol, alkylene glycols, such as ethylene glycol, triethylene glycol, propylene glycol, dipropylene glycol or poly(ethylene glycol)s, polyphenols, such as diphenols, bisphenols, such as bisphenol A, hydrogenated bisphenols, such as hydrogenated bisphenol A or addition products of bisphenol and of alkylene oxide, such as the addition products of bisphenol A/ethylene oxide or of bisphenol A/propylene oxide, triols, such as trimethylolpropane or trimethylolethane, and polyols comprising four or more alcohol functional groups, such as pentaerythritol, dipentaerythritol, glycerol and sorbitol.

Mention may be made, among the compounds with an amine functional group of use in the present invention, of alkyldiamines, alkyltriamines and arylamines, such as phenyldiamine, phenyltriamine or the compounds 1,6-hexanediamine; 1,2- and 1,3-propanediamine; 1,3-diaminocyclohexane; 4,4'-dimethyl-1,7-heptanediamine; 4,4'-methylenedianiline; xylylenediamine; 2-methylpiperazine; 2,6-dimethylpiperazine or bis(p-aminocyclohexyl)methane.

The polymerizable monomer or monomers with a labile proton generally represent 30 to 70% by weight with respect to the total weight of the polymerizable monomers in the composition, preferably 40 to 60% by weight.

The second monomer constituent of the photopolymerizable composition according to the invention is composed of one or more polymerizable monomers comprising one or more iso(thio)cyanate functional groups.

The polymerizable monomers with iso(thio)cyanate functional groups of the invention preferably comprise two or three iso(thio)cyanate functional groups and very particularly two iso(thio)cyanate functional groups.

The polymerizable monomers with iso(thio)cyanate functional groups are preferably devoid of an unsaturated group polymerizable by the radical route.

The polyiso(thio)cyanate compounds which can be used in the compositions of the present invention comprise polyisocyanate compounds and polyisothiocyanate compounds.

Mention may be made, among the polyisocyanate compounds which can be used in the compositions of the invention, of aliphatic polyisocyanates, alicyclic polyisocyanates, aromatic polyisocyanates, polyisocyanates of aromatic sulfide type and aromatic sulfonic amides.

Use may also be made, in the present invention, of halogenated derivatives, such as chlorinated and brominated derivatives, alkylated derivatives, alkoxylated derivatives, nitrated derivatives, addition products of prepolymer type with polyols, derivatives modified by means of carbodiimide, derivatives modified with urea, derivatives modified with biuret, and dimerized or trimerized products of the above polyisocyanate compounds.

Polyisocyanate derivatives suitable for the present invention are disclosed in particular in Patent EP-A-0,751,161.

A recommended class of polyisocyanate monomers are those corresponding to the formula (IV):

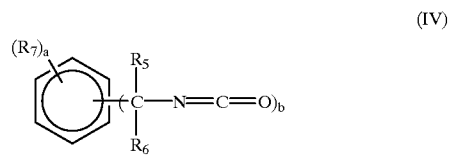

(IV)

in which the $R_5$ and $R_6$ radicals, which are identical or different, represent H or $CH_3$, $R_7$ represents H, Cl, Br, $CH_3$ or $C_2H_5$, a is an integer from 1 to 4 and b is an integer from 2 to 4, the sum a+b being equal to 6.

Mention may be made, among the polyisocyanates recommended in the present invention, of phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, xylylene diisocyanate, α,α,α',α'-tetramethylxylylene diisocyanate, 4,4'-diphenylmethane diisocyanate, hexamethylene diisocyanate, dicyclohexylmethane diisocyanate, isophorone diisocyanate and of [sic] bis(isocyanatomethyl) cyclohexane.

The recommended polyisocyanates are the aromatic polyisocyanates.

The preferred polyisocyanate according to the present invention is xylylene diisocyanate.

The polyisothiocyanate compounds which can be used in the compositions of the present invention preferably comprise two or three isothiocyanate groups and very particularly two isothiocyanate groups in the molecule and can also comprise one or more sulfur atoms in addition to the isothiocyanate groups.

Mention may be made, among the polyisothiocyanate compounds of use in the present invention, of aliphatic polyisothiocyanates, aromatic polyisothiocyanates and heterocyclic polyisothiocyanates, carbonyl polyisothiocyanates, aliphatic polyisothiocyanates comprising sulfur, and aromatic polyisothiocyanates comprising sulfur.

Use may also be made of halogenated derivatives, such as chlorinated and brominated derivatives, alkylated derivatives, alkoxylated derivatives, nitrated derivatives, addition products of prepolymer type with polyols, derivatives modified by means of carbodiimide, derivatives modified by means of urea, derivatives modified by means of biuret, and dimerized and trimerized products of the polyisothiocyanate compounds mentioned above.

Use may also be made of polyisothiocyanate compounds comprising isocyanate groups, for example aliphatic and alicyclic or alternatively aromatic compounds.

As above, use may also be made of halogenated derivatives, for example chlorinated and brominated derivatives, alkylated, alkoxylated or nitrated derivatives, addition products of prepolymer type with polyols and derivatives modified with carbodiimide, urea or biurea [sic], and the dimerized or trimerized products of these polyisothiocyanate compounds comprising isocyanate groups.

Polyisothiocyanate compounds are disclosed, inter alia, in Patent EP-A-0,751,161.

The polyisothiocyanate compounds of use in the present invention can be used alone or in the form of a mixture of one or more of these.

The monomer or monomers with an iso(thio)cyanate functional group generally represent from 30 to 70% by weight, preferably 40 to 60% by weight, of the photopolymerizable monomers present in the photopolymerizable composition.

The photopolymerizable compositions according to the invention can also, if appropriate, comprise one or more photopolymerizable monomers comprising one or more reactive unsaturated groups, preferably two or more unsaturated groups.

Mention may be made, among the monomers comprising two or more reactive unsaturated groups per molecule which can be used in the present invention, of compounds comprising one or more acrylic, thioacrylic, methacrylic, thiomethacrylic, vinyl and allyl groups. In the compounds which comprise several reactive unsaturated groups, the reactive unsaturated groups can be identical or different.

Mention may be made, among these compounds, of acetone compounds, such as diallylidenepentaerythritol and triallylidenesorbitol, bisphenol compounds, such as bisphenols having at least two vinyl, acryloyl, methacryloyl, thioacryloyl, thiomethacryloyl, allyloxy, allyl carbonate or analogous groups in the molecule, isocyanuric acid derivatives, such as isocyanuric acid derivatives comprising two or more acryloyl, thioacryloyl, methacryloyl, thiomethacryloyl, allyloxy and allyl carbonate groups, triazine compounds, such as triazine compounds comprising at least two acryloyl, thioacryloyl, methacryloyl, thiomethacryloyl, allyloxy and allyl carbonate groups, polyol or polythiol derivatives, such as polyol and polythiol derivatives obtained by reaction of a polyol or of a polythiol with acrylic acid, methacrylic acid, allyl chloroformate, allyl alcohol, halogenated allyl, glycidyl acrylate and glycidyl methacrylate, allyl and metallyl esters of polyvalent carboxylic acids, such as, for example, diallyl phthalate, diallyl orthophthalates or diallyl succinate, vinyl compounds, such as divinylbenzene, trivinylbenzene, divinylcyclohexane, trivinylcyclohexane, vinylcyclohexane, divinyl ether, hydroxymethylstyrene, mercaptomethylstyrene and divinyl adipate, reaction products of polyisocyanate, such as xylylene diisocyanate, with alcohols having unsaturated bonds, such as allyl alcohol and hydroxyethyl (meth) acrylate, polyolefinic compounds, such as dicyclopentadiene or dibutene, (meth)acrylic or thio(meth)acrylic acid esters, or diallyl compounds, such as diallyl ether, diallyl sulfide and diallyl disulfide.

Compounds with reactive unsaturated groups which are suitable for the present invention are disclosed in particular in Patent EP-A-0,751,161.

Thio(meth)acrylic compounds which can be used are mentioned in particular in Patent Application EP-745,620.

When they are present, this or these compounds with reactive unsaturated groups generally represent from 30 to 70% by weight, preferably from 30 to 50% by weight, with respect to the total weight of the photopolymerizable monomers present in the composition.

In the preferred photopolymerizable compositions according to the invention, the photopolymerizable monomer or monomers with a labile proton, in particular polythiols, represent approximately 50% by weight with respect to the total weight of the monomers present in the composition.

The photopolymerizable compositions according to the invention also comprise a photoinitiating agent which can be any photoinitiator or mixture of photoinitiators conventionally used to initiate the photopolymerization of the photopolymerizable monomers.

These photoinitiators are any compound producing free radicals under irradiation, whether by itself or by interaction with another proton-donating compound. That is to say, that the photoinitiators of use in the composition of the present invention can be equally well of the photocleavable type as of the photoactivable type.

A photocleavable photoinitiator comprises one or more compounds which function by directly generating one or more polymerization-initiating free radicals, whereas a photocleavable [sic] photoinitiator is formed of a system producing such radicals by a photoassisted oxidation/reduction reaction between a light-absorbing compound and a hydrogen or electron donor, both present in the system.

Very clearly, mixtures of the two types of photoinitiators can be used.

Mention may be made, among photocleavable photoinitiators, of acetophenone derivatives, such as 4-phenoxydichloroacetophenone, 4-t-butyldichloroacetophenone, 4-t-butyltrichloroacetophenone, diethoxyacetophenone, or 2-hydroxy-2-methyl-1-phenylpropane-1-one [sic] (Darocure® 1173), benzoin and benzoin derivatives, in particular benzoin ethers, such as benzoin methyl ether, benzoin ethyl ether, benzoin isopropyl ether or benzoin isobutyl ether, 1-hydroxycyclohexyl phenyl ketone (Irgacure® 184) and benzyl methyl ketone, phosphine oxides, benzoyloxime derivatives and benzil.

Mention may be made, by way of example, of
- CGI® 819 [bis(2,4,6-trimethylbenzoyl)phenylphosphine oxide];
- CGI® 1850: mixture (50/50 by weight) of bis(2,6-dimethoxybenzoyl)(2,4,6-trimethylpentyl)phosphine oxide and of Irgacure® 184;
- CGI® 1700: mixture comprising 75% by weight of Darocure® 1173 and 25% by weight of bis(2,6-dimethoxybenzoyl) (2,4,6-trimethylpentyl)phosphine oxide.

Mention may be made, among photoactivable photoinitiators, of benzophenone derivatives, such as benzophenone, benzoylbenzoic acid, methyl benzoylbenzoate, 4-phenylbenzophenone and hydroxybenzophenone, benzyl derivatives, xanthone derivatives, anthrone derivatives, thioxanthone derivatives, such as thioxanthone, 2-chlorothioxanthone, 2-methylthioxanthone and 2,4-dimethylthioxanthone, fluorenone derivatives, suberone derivatives, phosphine acids and their mixtures.

Use is preferably made of commercial photoinitiators, in particular Darocure® 1173, Irgacure® 184, CGI® 1700 and CGI® 819, and benzil.

The photoinitiating agent is generally used in a proportion of 0.01 to 5%, preferably 0.05 to 0.5%, by weight with respect to the total weight of the photopolymerizable monomers present in the composition.

The compositions according to the invention can also comprise a conventional catalyst for the condensation of urethanes or thiourethanes, such as dibutyltin dilaurate, in variable concentrations, generally 20 to 2000 ppm.

However, such a catalyst is very clearly not essential to the implementation of the invention.

Polymerizable compositions according to the invention result, in very short times, in a cured transparent polymer, of optical quality, in the absence of such a conventional condensation catalyst.

A first class of activating agents according to the present invention are the phosphines of formula $(R)_{3-x}PH_x$ (I), where R and x are as defined above.

The R radical of these phosphines is preferably chosen from linear or branched $C_1$–$C_6$, better still $C_1$–$C_3$, alkyl radicals, linear or branched $C_2$–$C_6$, better still $C_2$–$C_3$, alkenyl radicals, substituted or unsubstituted $C_6$–$C_{14}$ aryl radicals, in particular the phenyl radical and the substituted phenyl radical, $C_6$–$C_{14}$ ($C_1$–$C_6$ alkyl)aryl radicals, better still ($C_1$–$C_3$ alkyl)phenyl radicals and more particularly ($C_1$–$C_3$ alkyl)phenyl radicals comprising a single alkyl group in the para position, and $C_1$–$C_6$ (substituted or unsubstituted $C_6$–$C_{14}$ aryl)alkyl radicals.

The substituents of the substituted groups are generally chosen from the alkyl groups, preferably $C_1$–$C_4$ alkyl groups, halogens, preferably Br and Cl, amino, hydroxyl, alkoxy or cyano.

More preferably, in the phosphine activating agents according to the invention, x is equal to 0 or 1 and better still is equal to 0.

Recommended phosphines are tri(aryl)phosphines, in particular tri(aryl)phosphines comprising substituted aryl groups.

More preferably, the substituted aryl group is a phenyl group comprising at least one electron-withdrawing substituent, for example a halo substituent, such as Cl or F.

Mention may be made, among the particularly recommended phosphines according to the invention, of trialkylphosphines, such as trimethylphosphine or triethylphosphine, arylalkenylphosphines, such as diphenylvinylphosphine and diphenylallylphosphine, arylalkylphosphines, such as diphenylpropylphosphine, triarylphosphines, such as triphenylphosphine, tris(4-methoxyphenyl)phosphine or tris(4-methylphenyl)phosphine, tri(haloaryl)phosphines, such as tris(4-chlorophenyl)phosphine and tris(4-fluorophenyl)phosphine, aryl(alkyl)arylphosphines, such as diphenyl(p-tolyl)phosphine, and their mixtures.

Another class of activating agents suitable for the present invention are phosphorus halides, in particular phosphorus trihalides.

The phosphorus halides can be fluorides, chlorides, bromides or iodides or mixed phosphorus halides.

The recommended phosphorus halides are phosphorus trifluorides, trichlorides, tribromides and triiodides, very particularly phosphorus tribromide.

Very clearly, use may also be made, as activating agents, of a mixture of the various phosphorus halides or of the various phosphines or of phosphorus halides and of phosphine [sic].

The activating agent is generally used in the compositions according to the invention, based on 100 parts by weight of photopolymerizable monomers, in a proportion of 0.01 to 10 parts by weight, preferably 0.05 to 1 part by weight.

As indicated above, an essential characteristic of the invention is the presence in the mixture of an agent for activating the photoinitiating agent.

The compositions according to the invention can additionally comprise any adjuvant conventionally used in the manufacture of organic glasses, such as internal mold-release agents, chain extenders, crosslinking agents, light stabilizers, UV absorbers, antioxidants, dyes and pigments, and fillers.

The organic glasses of the ophthalmic lenses according to the invention are generally obtained by a casting photopolymerization process.

The photopolymerizable composition comprising the various ingredients is generally cast in a (generally inorganic) glass mold in two parts and is then irradiated by means of UV radiation in order to photopolymerize the composition. After polymerization, the two mold parts are dismantled and the optical article, for example an ophthalmic lens, is recovered.

In the following examples, except when otherwise indicated, all the parts and percentages are expressed by weight with respect to the total weight of monomers present in the compositions.

EXAMPLE 1

The mixtures shown in Table I below were prepared by mixing the appropriate ingredients.

TABLE I

| | | | Composition (parts by weight) | | | | | | |
|---|---|---|---|---|---|---|---|---|---|
| | | | Photoinitiating agent | | | | | | Activating |
| Mixture | PETMP | XDI | Darocure ® 1173 | Irgacure ® 184 | CGI ® 1700 | CGI ® 1850 | CGI ® 819 | Benzophenone | agent TPP |
| A | 56.5 | 43.5 | — | — | — | — | — | — | — |
| B | 56.5 | 43.5 | — | — | — | — | — | — | 0.1 |
| C | 56.5 | 43.5 | 0.1 | — | — | — | — | — | — |
| D | 56.5 | 43.5 | — | — | — | 0.1 | — | — | — |
| E | 56.5 | 43.5 | — | — | — | — | — | 0.1 | — |
| 1 | 56.5 | 43.5 | 0.1 | — | — | — | — | — | 0.1 |
| 2 | 56.5 | 43.5 | — | 0.1 | — | — | — | — | 0.1 |

TABLE I-continued

| | | | Composition (parts by weight) | | | | | | |
| | | | Photoinitiating agent | | | | | | Activating |
| Mixture | PETMP | XDI | Darocure ® 1173 | Irgacure ® 184 | CGI ® 1700 | CGI ® 1850 | CGI ® 819 | Benzophenone | agent TPP |
|---|---|---|---|---|---|---|---|---|---|
| 3 | 56.5 | 43.5 | — | — | 0.1 | — | — | — | 0.1 |
| 4 | 56.5 | 43.5 | — | — | — | 0.1 | — | — | 0.1 |
| 5 | 56.5 | 43.5 | — | — | — | — | 0.1 | — | 0.1 |
| 6 | 56.5 | 43.5 | — | — | — | — | — | 0.1 | 0.1 |

PETMP : Pentaerythritol tetrakis(mercaptopropionate) $C(CH_2COOCH_2CH_2SH)_4$ [sic]

XDI : Xylylene diisocyanate

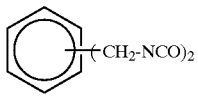

TPP : Triphenylphosphine

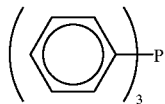

The mixtures of Table I were cast in a mold made of two parts (one made of plastic, the other made of glass, in order to facilitate dismantling) and the cast mixtures were, on the one hand, polymerized by heating at 100° C. for 2 hours, and, on the other hand, by UV irradiation in a Fusion, IST, Dr Hoenle conventional oven, comprising two lamps with an energy of 70 mW/cm², for 2 minutes.

The polymerization of the mixtures was characterized by infrared spectrography, by observing the disappearance of the NCO and SH bands and the appearance of the NH and COS functional groups.

The results are shown in Table II below.

TABLE II

| Mixture No. | Heating 100° C. - 2 hours | Uv 2 minutes - 70 mW/cm² |
|---|---|---|
| A | No polymerization | No polymerization |
| B | No polymerization | No polymerization |
| C | No polymerization | No polymerization |
| D | No polymerization | No polymerization |
| E | No polymerization | No polymerization |
| 1 | No polymerization | Polymerization |
| 2 | No polymerization | Polymerization |
| 3 | No polymerization | Polymerization |
| 4 | No polymerization | Polymerization |
| 5 | No polymerization | Polymerization |
| 6 | No polymerization | Polymerization |

Table II shows that there is no thermal polymerization under the chosen polymerization conditions and that the mixtures A to C, which do not comprise the photoinitiator activating agent mixture and which are thus outside the scope of the present invention, do not polymerize by UV irradiation under the conditions of the example. In contrast, extremely rapid polymerization of the mixtures 1 to 4 according to the invention is obtained.

The polymers obtained in this example are hard, transparent and colorless and do not give off an odor (which confirms the complete conversion of the system).

EXAMPLE 2

By operating as indicated in Example 1, the mixtures in Table III below were prepared and these mixtures were polymerized as in Example 1, with the results shown in Table IV below.

TABLE III

| | | | Composition (parts by weight) | | | | |
| | | | Photoinitiating agent | | | | |
| Mixture No. | MDO | XDI | Darocure ® 1173 | Irgacure ® 184 | CGI 1700 | CGI 819 | Activating agent TPP |
|---|---|---|---|---|---|---|---|
| F | 47.9 | 52.1 | — | — | — | — | — |
| G | 47.9 | 52.1 | — | — | — | — | 0.1 |
| H | 47.9 | 52.1 | 0.1 | — | — | — | — |
| 7 | 47.9 | 52.1 | 0.1 | — | — | — | 0.1 |
| 8 | 47.9 | 52.1 | — | 0.1 | — | — | 0.1 |
| 9 | 47.9 | 52.1 | — | — | 0.1 | — | 0.1 |
| 10 | 47.9 | 52.1 | — | — | — | 0.1 | 0.1 |

MDO: 4-Mercaptomethyl-3,6-dithio-1,8-octanedithiol [sic]

TABLE III-continued

Composition (parts by weight)

| Mixture No. | MDO | XDI | Photoinitiating agent | | | | Activating agent TPP |
|---|---|---|---|---|---|---|---|
| | | | Darocure ® 1173 | Irgacure ® 184 | CGI 1700 | CGI 819 | |

$$HS-CH_2-CH-CH_2$$
$$\qquad\quad |\quad\ |$$
$$\qquad\quad S\quad\ S$$
$$\qquad\quad |\quad\ |$$
$$\quad (CH_2)_2\ (CH_2)_2$$
$$\qquad\quad |\quad\ |$$
$$\qquad\ SH\quad SH$$

TABLE IV

| Mixture No. | Heating 100° C. - 2 hours | Uv 2 minutes - 70 mW/cm² |
|---|---|---|
| F | No polymerization | No polymerization |
| G | No polymerization | No polymerization |
| H | No polymerization | No polymerization |
| 7 | No polymerization | Polymerization |
| 8 | No polymerization | Polymerization |
| 9 | No polymerization | Polymerization |
| 10 | No polymerization | Polymerization |

As is shown by Table IV, the mixtures which do not comprise an activating agent according to the invention do not photopolymerize, whereas the compositions 7 to 10 according to the invention polymerize in a very short time.

The polymers obtained are hard, transparent and colorless and do not give off an odor (which confirms the complete conversion of the system).

EXAMPLE 3

By operating as in Example 1, the mixtures in Table V below are prepared and are polymerized, with the results shown in Table VI below.

TABLE V

Composition (parts by weight)

| Mixture No. | PETMP | DCHDI | Photoinitiating agent | | | | Activating agent TPP |
|---|---|---|---|---|---|---|---|
| | | | Darocure ® 1173 | Irgacure ® 184 | CGI 1700 | CGI 819 | |
| I | 39.8 | 60.2 | — | — | — | — | — |
| J | 39.8 | 60.2 | — | — | — | — | 0.1 |
| K | 39.8 | 60.2 | 0.1 | — | — | — | — |
| 11 | 39.8 | 60.2 | 0.1 | — | — | — | 0.1 |
| 12 | 39.8 | 60.2 | — | 0.1 | — | — | 0.1 |
| 13 | 39.8 | 60.2 | — | — | 0.1 | — | 0.1 |
| 14 | 39.8 | 60.2 | — | — | — | 0.1 | 0.1 |

DCHDI: Dicyclohexylmethane 4,4'-diisocyanate
OCH—C$_6$H$_8$—CH$_2$—C$_6$H$_8$—NCO [sic]

TABLE VI

| Mixture No. | Heating 100° C. - 2 hours | Uv 2 minutes - 70 mW/cm² |
|---|---|---|
| I | No polymerization | No polymerization |
| J | No polymerization | No polymerization |
| K | No polymerization | No polymerization |
| 11 | No polymerization | Polymerization |
| 12 | No polymerization | Polymerization |
| 13 | No polymerization | Polymerization |
| 14 | No polymerization | Polymerization |

The polymers obtained are hard, transparent and colorless and do not give off an odor (which confirms the complete conversion of the system).

EXAMPLE 4

By operating as in Example 1, mixtures are prepared comprising 56.5 parts by weight of PETMP, 43.5 parts by weight of XDI, 0.1 part by weight of Darocure® 1173 photoinitiator and 0.1 part by weight of various compound A identified in Table VII below.

The mixtures were prepared by initially dissolving the compounds A in XDI, followed by the photoinitiator. The mercaptan is subsequently added. By operating in this way, the effect of each of the constituents can be determined separately. The various mixtures are then subjected to polymerization by UV irradiation as described in Example 1.

The results are given in Table VII below.

TABLE VII

| A | Name | Polymerization under UV | Reaction of A with XDI |
|---|---|---|---|
| 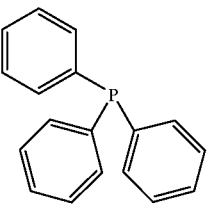 | Triphenylphosphine TPP | YES | NO |
| 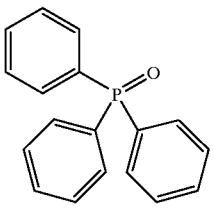 | Triphenylphosphine oxide TPPO | NO | NO |
| 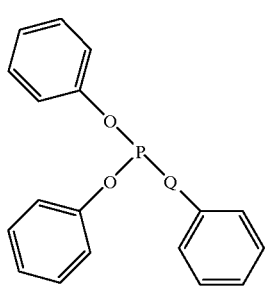 | Triphenyl phosphite TPPi | NO | NO |
| 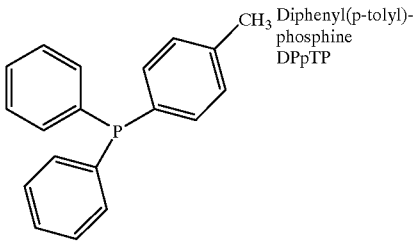 | Diphenyl(p-tolyl)- phosphine DPpTP | YES | NO |
| 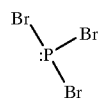 | Phosphorus tribromide PTBr | YES | NO |
| 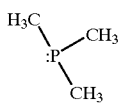 | Trimethylphosphine TMP | YES | YES formation of isocyanurate |
| 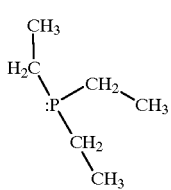 | Triethylphosphine TEP | YES | YES formation of isocyanurate |

TABLE VII-continued

| A | Name | Polymerization under UV | Reaction of A with XDI |
|---|---|---|---|
| | Diphenylvinyl-phosphine DPVP | YES | YES |
| | Allyl-diphenylphosphine ADPP | YES | YES |
| | Diphenylpropyl-phosphine DPPP | YES | YES |
| | Triphenylborane TPB | NO | NO |
| | Triphenylbismuth TPBi | NO | NO |
| | Triphenylamine TPA | NO | NO |

TABLE VII-continued

| A | Name | Polymerization under UV | Reaction of A with XDI |
|---|------|------------------------|------------------------|
| (structure of triphenylantimony) | Triphenylantimony TPAn | NO | NO |

In the case of the arylphosphine derivatives of triphenylphosphine type, no side reaction is observed. The only reaction identified is the polyiso(thio)cyanate/compound with a labile proton reaction.

In the case where the activating agent is a phosphine comprising at least one alkyl group, a side reaction can take place (isomerization of the isocyanates to isocyanurates) but this remains limited and the reaction results, however, in transparent glasses of optical quality.

This exothermic side reaction exhibits, however, the advantage of activating the polyiso(thio)cyanate/compound with a labile proton reaction. In this case, the reaction can take place at ambient external temperature and in the absence of any irradiation.

EXAMPLE 5

By operating as in Example 1, the following mixture was prepared:

| | Mass (g) |
|---|---|
| HO—(CH$_2$CH$_2$O)$_m$—C$_6$H$_4$—C(CH$_3$)$_2$—C$_6$H$_4$—(OCH$_2$CH$_2$)$_n$—OH, $0 \leq m + n \leq 12$ | 68 |
| Xylylene diisocyanate | 32 |
| Darocure ® 1173 | 0.1 |
| Triphenylphosphine (TPP) | 0.1 | and this mixture was polymerized as shown in Example 1.

The degree of conversion is measured.

The latter reaches 50% after irradiating for two minutes. By way of comparison, the same experiment as above is repeated in the absence of TPP.

The degree of conversion of 50% is only reached after 40 minutes.

EXAMPLE 6

By operating as in Example 1, the mixtures according to the invention as shown in Table VIII below were prepared and the mixtures are exposed to UV light for one minute (Fusion Lamp F450 with a V bulb) before being treated thermally at 130° C. for 2 hours.

The percentages of gel were evaluated by weighing after UV irradiation. The results are given in Table VIII.

TABLE VIII

Composition (parts by weight)

| | | | | Photoinitiating agent | | |
|---|---|---|---|---|---|---|
| Mixture No. | PETMP | XDI | Activating agent TPP | Darocure ® 1173 | Benzil | Gel (%) |
| 15 | 56.5 | 43.5 | 0.3 | 0.31 | — | 100 |
| 16 | 56.5 | 43.5 | 0.1 | — | 0.1 | 95 |
| 17 | 56.5 | 43.5 | 0.3 | — | 0.38 | 100 |

EXAMPLE 7

The mixtures in Table IX below are prepared and are subjected to UV irradiation as in Example 6. The gelling time under UV irradiation and in the absence of irradiation (in the dark) are measured. The gelling time in the dark constitutes an indication of the stability of the mixtures.

The results are reported in Table IX.

TABLE IX

| Mixture No. | Composition (parts by weight) | | | | | | | | Gelling time under U.V. | Gelling time in the dark (stability) |
|---|---|---|---|---|---|---|---|---|---|---|
| | PETMP | XDI | Activating agent | | | | | Photoinitiating agent Darocure® 1173 | | |
| | | | 1 | 2 | 3 | 4 | 5 | | | |
| 18 | 56.5 | 43.5 | 0.3 | — | — | — | — | 0.3 | <10 s | <1 minute |
| 19 | 56.5 | 43.5 | — | 0.3 | — | — | — | 0.3 | <10 s | <1 minute |
| 20 | 56.5 | 43.5 | — | — | 0.3 | — | — | 0.3 | 30 s | 2 hours |
| 21 | 56.5 | 43.5 | — | — | — | 0.3 | — | 0.3 | 60 s | >1 day |
| 22 | 56.5 | 43.5 | — | — | — | — | 0.3 | 0.3 | 90 s | >1 day |

| | Activating agent |
|---|---|
| 1 | Tris (4-methoxyphenyl) phosphine |
| 2 | Tris (4-methylphenyl) phosphine |
| 3 | Triphenylphosphine |
| 4 | Tris (4-chlorophenyl) phosphine |
| 5 | Tris (4-fluorophenyl) phosphine |

The results show that the phosphines comprising phenyl groups substituted by electron-withdrawing groups (chloro and fluoro) result in more stable mixtures without significant modification of the reactivity under U.V. irradiation, compared with the phosphines comprising phenyl groups substituted by electron-donating groups (methoxy and methyl).

What is claimed is:

1. A photopolymerizable composition comprising at least one photopolymerizable monomer with a labile proton, at least one polymerizable monomer comprising one or more iso(thio)cyanate functional groups, a photoinitiating agent, and an activator of the photoinitiating agent, which activator comprises a compound selected from the group consisting of trivalent phosphines, phosphorus halides and mixtures thereof.

2. The composition of claim 1, wherein the activator comprises a phosphine that corresponds to the formula $(R)_{3-x}PH_x$, wherein each R is independently defined as a linear or branched alkyl radical, an unsubstituted or substituted cycloalkyl radical, a linear or branched alkenyl radical, an unsubstituted or substituted cycloalkenyl radical, an unsubstituted or substituted aryl radical, an unsubstituted or substituted (alkyl)aryl radical or an unsubstituted or substituted (aryl)alkyl radical, and x is an integer from 0 to 2.

3. The composition of claim 2, wherein each R is independently defined as a linear or branched $C_1$–$C_6$ alkyl radical, a linear or branched $C_1$–$C_6$ alkenyl radical, a substituted or unsubstituted $C_1$–$C_{14}$ aryl radical, a $C_6$–$C_{14}$ ($C_1$–$C_6$ alkyl)aryl radical, or a substituted or unsubstituted ($C_6$–$C_{14}$ aryl) or $C_1$–$C_6$ alkyl radical.

4. The composition of claim 3, wherein each R is independently defined as a methyl, ethyl, vinyl, allyl, phenyl, p-tolyl, p-ethylphenyl, p-propylphenyl, p-methoxyphenyl, p-chlorophenyl, or p-fluorophenyl radical.

5. The composition of claim 2, wherein at least one R is a phenyl group substituted by at least one electron-withdrawing group.

6. The composition of claim 2, wherein x is 0 or 1.

7. The composition of claim 6, wherein x is 0.

8. The composition of claim 6, wherein the phosphine comprises trimethylphosphine, triethylphosphine, diphenylvinylphosphine, diphenylallylphosphine, diphenylpropylphosphine, triphenylphosphine, diphenyl(p-tolyl)phosphine, tris(4chlorophenyl)phosphine, tris(4-fluorophenyl)phosphine, or tris(4-methoxyphenyl) phosphine.

9. The composition of claim 1, wherein the activator comprises a tri(aryl)phosphine.

10. The composition of claim 1, wherein the activator comprises a phosphorus halide.

11. The composition of claim 10, wherein the phosphorus halide is a phosphorus trihalide.

12. The composition of claim 11, wherein the phosphorus trihalide is phosphorus tribromide.

13. The composition of claim 1, wherein the at least one monomer with a labile proton is a polythiol, polyol, or a primary or secondary polyamine.

14. The composition of claim 13, wherein the at least one monomer with a labile proton is a polythiol.

15. The composition of claim 14, wherein the polythiol comprises two or more thiol functional groups.

16. The composition of claim 1, wherein the at least one monomer with a labile proton is not polymerizable by a radical.

17. The composition of claim 1, wherein the at least one monomer with a labile proton is a polythiol having a formula:

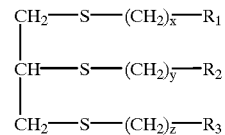

in which each of $R_1$, $R_2$ and $R_3$ are independently an H or SH radical, at least two from $R_1$, $R_2$ and $R_3$ are SH groups, and x, y and z are integers between 0 and 8 inclusive, or a polythiol of formula:

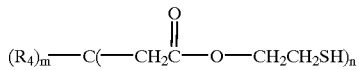

in which $R_4$ is methyl, propyl, chloro- or bromomethyl group, m is an integer between 0 and 2 inclusive, and n is equal to 4-m.

18. The composition of claim 1, wherein the monomer comprising one or more iso(thio)cyanate functional group comprises two or more iso(thio)cyanate functional groups.

19. The composition of claim 1, wherein the monomer comprising one or more iso(thio)cyanate functional group is a polyisocyanate.

20. The composition of claim 1, wherein the monomer comprising one or more iso(thio)cyanate functional group is a aromatic polyisocyanate.

21. The composition of claim 20, wherein the polyisocyanate is of the formula:

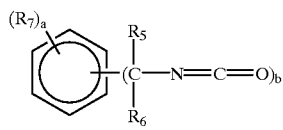

in which $R_3$ and $R_6$, are independently H or $CH_3$, $R_7$ is H, Cl, Br, $CH_3$ or $C_2H_5$, a is an integer from 1 to 4 inclusive, b is an integer from 2 to 4 inclusive, and the sum of a+b is 6.

22. The composition of claim 1, wherein the monomer comprising at least one iso(thio)cyanate functional group is not polymerizable by a radical.

23. The composition of claim 1, further comprising one or more additional polymerizable monomers comprising one or more reactive unsaturated groups.

24. The composition of claim 1, comprising a component comprising one or more polymerizable monomer comprising a labile proton, which component comprises 30 to 70% by weight of total polymerizable monomers in the composition.

25. The composition of claim 1, comprising a component comprising one or more polymerizable monomer comprising one or more iso(thio)cyanate functional group, which component comprises 30 to 70% by weight of total polymerizable monomers in the composition.

26. The composition of claim 1, comprising a component comprising one or more monomer comprising one or more reactive unsaturated group, which component comprises up to 40% by weight of total polymerizable monomers in the composition.

27. The composition of claim 26, wherein the component comprises up to 5% by weight of total polymerizable monomers in the composition..

28. The composition of claim 1, wherein the photoinitiating agent is comprised of one or more photocleavable or photoactivable photoinitiators.

29. The composition of claim 28, wherein the photoinitiating agent is a photocleavable photoinitiator comprising one or more of an acetophenone derivative, benzoin, a benzoin derivative, phosphine oxide, a benzoyloxime derivative, or benzil.

30. The composition of claim 28, wherein the photoinitiating agent is a photoactivable photoinitiator comprising one or more of benzophenone, a benzophenone derivative, a benzyl derivative, a xanthone derivative, an anthone derivative, a thioxanthone derivative, a fluorenone derivative, a suberone derivative, or phosphine acid.

31. The composition of claim 1, wherein the photoinitiating agent is present in a proportion of 0.01 to 0.5% by weight with respect to total weight of the polymerizable monomers present in the composition.

32. The composition of claim 1, wherein the activator is present in a proportion of 0.01 to 0.5% by weight with respect to total weight of the polymerizable monomers present in the composition.

33. The composition of claim 1, further defined as not comprising any conventional catalyst for the condensation of urethanes or thiourethanes.

34. An article made by a process comprising obtaining a photopolymerizable composition comprising at least one photopolymerizable monomer with a labile proton and at least one polymerizable monomer comprising one or more iso(thio)cyanate functional groups, a photoinitiating agent, and activator of the photoinitiating agent, the activator comprising a compound selected from the group consisting of phosphines, phosphorus halides and mixtures thereof, molding the photopolymerizable composition, and photopolymerizing the compositions.

35. The article of claim 34, further defined as an ophthalmic lens.

* * * * *

UNITED STATES PATENT AND TRADEMARK OFFICE
CERTIFICATE OF CORRECTION

PATENT NO. : 6,225,021 B1
DATED : July 3, 2001
INVENTOR(S) : Yasuyuki Kusumoto et al.

It is certified that error appears in the above-identified patent and that said Letters Patent is hereby corrected as shown below:

Column 2,
Lines 9-10, "[(CH$_3$O)PO]" should be -- [(CH$_3$O)$_3$PO] --

Signed and Sealed this

Fourth Day of December, 2001

Attest:

NICHOLAS P. GODICI
Attesting Officer     Acting Director of the United States Patent and Trademark Office

UNITED STATES PATENT AND TRADEMARK OFFICE
CERTIFICATE OF CORRECTION

PATENT NO.    : 6,225,021 B1
DATED         : May 1, 2001
INVENTOR(S)   : Widawski et al.

It is certified that error appears in the above-identified patent and that said Letters Patent is hereby corrected as shown below:

This certificate supersedes Certificate of Correction issued December 4, 2001, the number was erroneously mentioned and should be deleted since no Certificate of Correction was granted.

Signed and Sealed this

Third Day of September, 2002

*Attest:*

JAMES E. ROGAN
*Director of the United States Patent and Trademark Office*

*Attesting Officer*